United States Patent  
Huber

[15] 3,699,136  
[45] Oct. 17, 1972

[54] PREPARATION OF CORTISONE COMPOUNDS AND PREDNISONE COMPOUNDS

[72] Inventor: Joel E. Huber, Kalamazoo, Mich.
[73] Assignee: The Upjohn Company, Kalamazoo, Mich.
[22] Filed: Jan. 6, 1972
[21] Appl. No.: 215,918

[52] U.S. Cl. ............................................. 260/397.45
[51] Int. Cl. ............................................. C07c 169/34
[58] Field of Search ....... /Machine Searched Steroids

[56] References Cited

UNITED STATES PATENTS 3,104,246    9/1963    Amiard et al. ......... 260/397.45

OTHER PUBLICATIONS

Rothman et al., J. Org. Chem. 25 p. 1966–1968 (1960).

*Primary Examiner*—Henry A. French
*Attorney*—John Kekich et al.

[57] ABSTRACT

$\Delta^4$-3,11,20-Triketo steroids are iodinated in the presence of azobisisobutyronitrile to produce a mixture of unstable iodides, and the latter are treated with acylolysis reagents to produce a substantial fraction of $\Delta^{1,4}$-3,11,20-triketo-21-acyloxy products.

4 Claims, No Drawings

PREPARATION OF CORTISONE COMPOUNDS AND PREDNISONE COMPOUNDS

BACKGROUND OF THE INVENTION

The introduction of a 21-hydroxyl group into certain kinds of steroids by the sequential steps of (1) iodination and (2) acylolysis has been described, particularly with respect to the production of 21-acetoxy-17α-hydroxy-4-preg-nene-3,12,20-trione from 17α-hydroxy-4-pregnene-3,12,20-trione (Rothman, et al., J. Org. Chem., 25, pages 1966–68).

The iodination of certain kinds of steroids that contain an unsubstituted 21-carbon to produce a 21-diiodo product is described in U. S. Pat. No. 3,104,246 particularly with respect to the production of 21-diiodo-16β-methyl-$\Delta^{1,4,9(11)}$-pregnatriene-17α-ol-3,20-dione. This diiodo product is then treated with acetic acid and potassium acetate in the presence of dimethylformamide to produce corresponding 21-acetoxy compound. See Step H of the patent.

SUMMARY OF THE INVENTION

I have discovered that the known iodination conditions (I), such as described above in the acknowledged prior art, when applied to a $\Delta^4$-3,11,20-triketo steroid having an unsubstituted 21-carbon atom, in the presence of azobisisobutyronitrile, yields a mixture of unstable iodides which can be treated directly (2) with the acylolysis reagents described above and more particularly below to produce a mixture of 21-acylated steroids corresponding in structural character to the starting material with the exception of the introduced 21-acyloxy group and with the further surprising exception of a substantial fraction n the mixture having an introduced $\Delta^1$-bond.

Thus, for example, I can produce prednisone in substantial quantities by applying the successive steps of (1) and (2) to 17α-hydroxy-4-pregnene-3,11,20-trione.

The reaction of this invention can be applied to any starting material having the fundamental $\Delta^4$-3,11,20-triketo-pregnene structural characteristic, and the result will be the corresponding 21-acylate product mixture of $\Delta^4$ and $\Delta^{1,4}$ steroids.

The above reaction can be shown as follows:

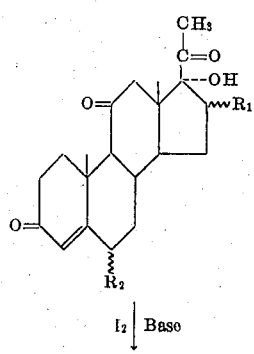

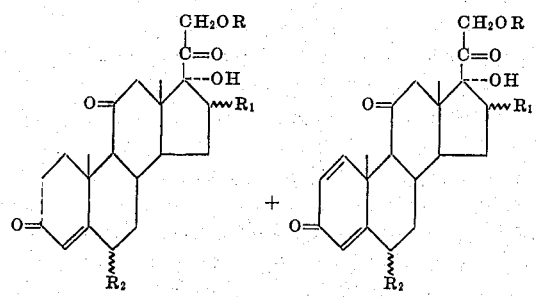

wherein R is the acyl radical of a hydrocarbon carboxylic acid of from two to 12 carbon atoms, and $R_1$ and $R_2$ are H, methyl or fluoro, M is an alkali metal and Alk is an alkyl group of from one to four carbon atoms.

The $\Delta^1$-3,11,20-triketo pregnene starting material can be one which contains substituent groups such as the 6-methyl, the 16-methyl, and the like which do not take part in either of reactions (1) or (2).

Step (1), the iodination, can be carried out in an inert reaction medium in the presence of an inorganic base such as calcium hydroxide, magnesium hydroxide, or sodium carbonate. The iodine can be added in solution, and the reaction takes place at room temperature or above, and preferably below the boiling point of the mixture.

Step (2) can be carried out by taking the iodinate product (1) with or without purification, dissolved in an inert reaction medium and subjecting it to reaction with a hydrocarbon carboxylic acid such as acetic acid, propionic acid, Valeric acid, isovaleric acid, trimethyl acetic (pivalic) acid, hexanoic acid, diethylacetic, cyclopentylacetic, benzoic, ethylbenzoic, succinic acid and the like in the presence of a trialkylamine, e.g., trimethylamine, triethylamine or triisopropylamine and permitting the reaction which ensues to continue until completion. The acyloxyated product can be recovered from the reaction mixture by crystallization, chromatographic separation or similar methods and it can be purified by recrystallization as is known in the art.

The amount of azobisisobutyronitrile to be used in (1) can vary from 0.05 to 5 percent of the weight of the starting steroid material, and the quantity of iodine used in (1) can be from 2 to 4 moles per mole of starting steroid material. The amount of carboxylic acid and trialkyl amine, with respect to each other can vary from 0.5 to 2.0 molar proportions, and the amount of carboxylic acid can vary from a molar amount up to twice a molar amount based upon the quantity of steroid in the reaction mixture.

Step (2) can be carried out using an alkali metal salt of the carboxylic acid in place of the acid/amine mixture noted above. When the salt, e.g., potassium carboxylate, is used it is conveniently added to the reaction mixture in the form of a solution in an inert solvent as acetone.

DESCRIPTION OF THE PREFERRED EMBODIMENTS

Example 1   Preparation of Cortisone Acetate and Prednisone Acetate

To a solution of 1.0 g. of 17α-hydroxy-4-pregnene-3,11,20-trione in 20 ml. of dry methanol was added 1.0 g. of finely powdered calcium oxide and 100 mg. of azobisisobutyronitrile. The temperature was adjusted to 25° and a solution of 2.25 g. of iodine in 3.5 ml. of dry methanol and 5 ml. of dry tetrahydrofuran was added dropwise with stirring over a 70 minute period. After stirring for an additional 10 minutes, the reaction mixture was filtered to remove the unreacted calcium oxide. The solids were washed with methylene chloride and the combined wash and filtrate was added to 200 ml. of benzene. This was washed with 50 ml. of sodium thiosulfate, 25 ml. of saturated sodium bi-carbonate and several portions of water.

The benzene layer was concentrated in vacuo to dryness and the residue was dissolved in 15 ml. of acetone. This was added to a solution of 5 ml. of glacial acetic acid and 7 ml. of triethyl amine in 15 ml. of acetone and was heated at reflux for 1.5 hours. The dark reaction mixture was added to 200 ml. of benzene and this was washed thoroughly with water. The organic layer was concentrated in vacuo to dryness and the high boiling residue was chromatographed on a 150 g. silica gel column. The column was developed with 1 percent methanol in chloroform, and 100 ml. fractions were taken. Fractions 12–14 were combined, concentrated, and the residue crystallized from acetone to give 313 mg. of cortisone acetate: m.p. 242°–246°; $[\alpha]_D + 198°$ (dioxane, C 1.03); UV max (95% EtOH) 239 nm (14,000).

Fractions 16–20 were combined, concentrated, and the residue crystallized from acetone to give 162 mg. of prednisone acetate: m.p. 238°–239°; $[\alpha]_D + 184°$ (dioxane, C 1.05); UV max (95% EtOH) 239 nm (15,200).

Example 2

The process of Example 1 can be repeated substituting potassium pivalate for the acetic acid/trimethylamine mixture of Example 1. The product is a mixture of cortisone 21- pivalate and prednisone 21- pivalate.

The substitution of 6α-fluorocortisone in the process of Example 1 yields a mixture of 6α-fluorocortisone 21-acetate and 6α-fluoro prednisone 21-acetate.

The substitution of 6-methyl or 16-methyl cortisone in the process of Example 1 results in a mixture of the corresponding 6-methyl or 16-methyl cortisone acetates and 6-methyl or 16-methyl prednisone acetates.

I claim:

1. A method for producing a mixture of compounds of the following structural formulas:

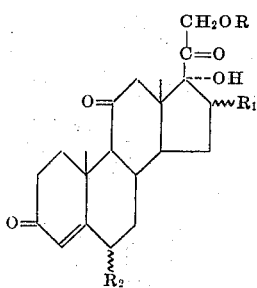

and

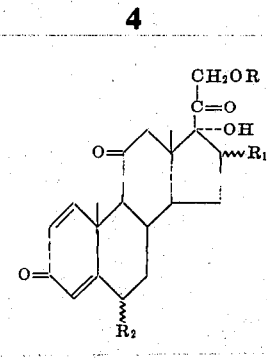

wherein R is the acyl radical of a hydrocarbon carboxylic acid of from two to 12 carbon atoms, and $R_1$ and $R_2$ are H, methyl or fluoro, which comprises subjecting a compound of the formula:

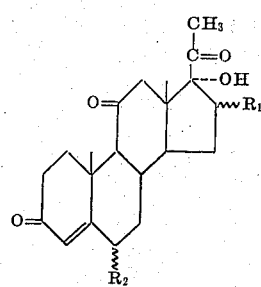

wherein $R_1$ and $R_2$ are as defined above, to iodination by reaction with iodine in the present of an inorganic base and azobisisobutyronitrile to produce a mixture of unstable iodo compounds and reacting the latter with a member of the group consisting of a mixture of a hydrocarbon carboxylic acid from one to 12 carbon atoms, with a trialkyl amine in which the alkyl group is from one to four carbon atoms, and an alkali metal salt of a hydrocarbon carboxylic acid from one to 12 carbon atoms, to effect 21-acyloxylation and substantial 1-dehydrogenation of the starting material.

2. The method of claim 1 in which the hydrocarbon carboxylic acid in either alternative is acetic acid.

3. The method of claim 1 in which the hydrocarbon carboxylic acid in either alternative is pivalic acid.

4. The method according to claim 1 for producing a mixture of cortisone acetate and prednisone acetate which comprises reacting 17α-hydroxy-4-pregnen-3,11,20-trione with about a 2-molar proportion of iodine in the presence of calcium oxide and azobisisobutyronitrile, removing unreacted calcium oxide from the reaction mixture and separating water solubles therefrom; reacting the iodinated product in solution with glacial acetic acid and triethylamine until completion of the reaction, and recovering from the reaction mixture cortisone 21-acetate and prednisone 21-acetate.

* * * * *